(No Model.)
W. T. ADAMS.
MOLD FOR ARTIFICIAL TEETH.
No. 488,976.            Patented Jan. 3, 1893.
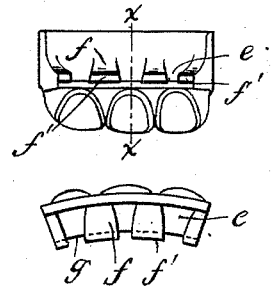
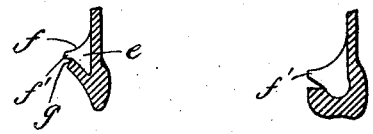
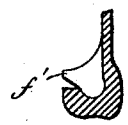
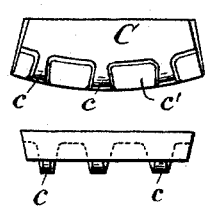
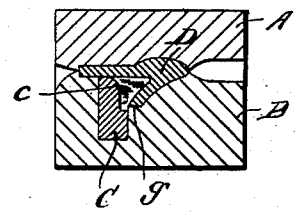
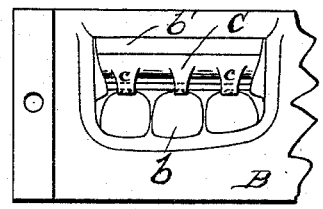
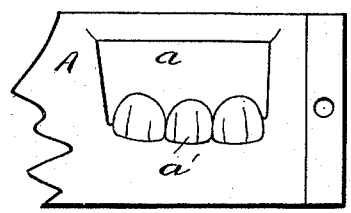

UNITED STATES PATENT OFFICE.

WILLIAM T. ADAMS, OF READING, PENNSYLVANIA.

MOLD FOR ARTIFICIAL TEETH.

SPECIFICATION forming part of Letters Patent No. 488,976, dated January 3, 1893.

Application filed April 4, 1892. Serial No. 427,667. (No model.)

*To all whom it may concern:*

Be it known that I, WILLIAM T. ADAMS, a citizen of the United States, residing at Reading, in the county of Berks, State of Pennsylvania, have invented certain Improvements in Molds for Artificial Teeth, of which the following is a specification.

This invention relates particularly to that class of dentures in which the teeth are formed of porcelain and are secured to rubber plates by embedding them previous to the process of vulcanizing.

The object of my invention is to provide an improved means for forming artificial teeth of that class in which the teeth are so formed as to obviate the necessity for the employment of platinum pin or staples to secure them to the rubber plate. This object is accomplished by the construction illusrated in the accompanying drawings, in which Figure 1 shows in rear elevation and plan view a block of three teeth formed by my improved mold. Fig. 2 is a cross-section through X X Fig. 1. Fig. 3 shows in rear elevation and bottom view the removable piece or drawback of the mold, which is withdrawn therefrom with the block. Fig. 4 is a plan view of the drag or lower part of the mold with the draw back in place. Fig. 5 is a similar view of the top part of the mold. Fig. 6 is a cross-section of the complete mold and of the block as formed therein. Fig. 7 is a cross-section similar to Fig. 2 of a modified form of tooth, which may be formed by very slight alterations in the form of my mold.

The top part A of the mold is formed as usual with a cavity $a\ a'$ forming the face of the teeth and of the portion of the gum attached thereto. The lower part B is also provided with a similar cavity $b\ b'$ for the rear of the teeth and gum portion; this cavity however is deepened to receive a removable piece C which is nicely fitted thereto and which enables the teeth to be cast to the desired shape, as indicated in Figs. 1 and 2. This piece is provided with spurs $c$ which project to form dove-tail-shaped recesses $e$ in each tooth, and is cut away between these spurs as shown at $c'$, the depressions thus made extending beyond the inner face $g$ of the tooth so as to form raised portions $f$ on the base of the tooth which portions overhang at $f'$ the inner face of the tooth, as shown in Figs. 1, 2, and 6. The removable piece C is placed in position in the part B, as indicated in Fig. 4 and the enamel and body composition are placed in the matrix as usual. After being pressed into shape, and sufficiently hardened to permit handling, the mold is opened and the block removed, the piece C coming with it and being afterward withdrawn, thus leaving the block in the shape indicated. Afterward it is subjected to the usual treatment during which it is considerably reduced in size by shrinkage. The operation of securing it to the plate consists merely in pressing it into the plastic material so that the latter is caused to conform to the shape of the tooth or teeth, and when the plate is vulcanized it will be impossible to loosen the teeth the rubber filling the recesses $e$ and extending under the overhanging projections $f'$ so as to effectually prevent movement in any direction. The raised portions $f$ cover the intersections of the teeth and sufficient material is allowed to permit proper fitting without affecting the overhang $f'$; they are thus adapted to substantially strengthen the block at the very points where the breakage is most liable to occur.

In the modified form indicated in Fig. 7 the overhang $f'$ is secured by merely under cutting the inner face of the tooth, thus avoiding any inward projection beyond the normal line of the tooth; this involves but a slight and obvious change in the form of the mold.

I do not claim broadly a tooth or block of teeth having a recess or recesses in its base, nor do I claim broadly a tooth or block of teeth having a tenon or tenons at the base of the tooth or teeth, since I am aware that neither of such constructions are broadly new with me, but:—

What I claim is:—

1. In an artificial tooth mold the combination with the part B for shaping the rear of the denture, of the removable piece or draw back C fitted thereto and provided with a stud or studs *c* for forming a recess in the base of the tooth, substantially as and for the purpose set forth.

2. In an artificial tooth mold the combination with the part B for shaping the rear of the denture of the removable piece or draw back C fitted thereto and provided with a depression *c'* and studs *c* whereby the base of each tooth in the denture will be formed with alternate recesses *e* and overhanging projections *f'*, substantially as and for the purpose set forth.

In testimony whereof I affix my signature in presence of two witnesses.

WM. T. ADAMS.

Witnesses:
W. G. STEWART,
ADAM L. OTTERBEIN.